US006942422B2

(12) United States Patent
Byrd et al.

(10) Patent No.: US 6,942,422 B2
(45) Date of Patent: Sep. 13, 2005

(54) MULTI-CHAMBER OIL BOOM VALVE

(75) Inventors: Kenneth E. Byrd, Rome, GA (US); Hancel Renae Wright, Rockmart, GA (US)

(73) Assignee: Engineered Fabrics Corporation, Rockmart, GA (US)

( * ) Notice: Subject to any disclaimer, the term of this patent is extended or adjusted under 35 U.S.C. 154(b) by 0 days.

(21) Appl. No.: 10/748,793

(22) Filed: Dec. 31, 2003

(65) Prior Publication Data

US 2005/0141965 A1 Jun. 30, 2005

(51) Int. Cl.[7] .............................................. E02B 15/06
(52) U.S. Cl. .......................................... 405/63; 405/68
(58) Field of Search ............................. 405/68, 69, 63, 405/66

(56) References Cited

U.S. PATENT DOCUMENTS

| | | | | | |
|---|---|---|---|---|---|
| 3,703,811 | A | * | 11/1972 | Smith | 405/68 |
| 3,859,796 | A | * | 1/1975 | Benson | 405/64 |
| 4,015,431 | A | * | 4/1977 | Ahiko | 405/68 |
| 5,022,785 | A | | 6/1991 | Goans | |
| 5,298,175 | A | * | 3/1994 | Whidden, Jr. | 210/776 |
| 5,346,329 | A | | 9/1994 | Goans et al. | |
| 5,522,674 | A | * | 6/1996 | Cooper | 405/63 |

OTHER PUBLICATIONS

World Catalog of Oil Spill Response Products; Robert Schulze (Editor); 5th Edition (1995); Kepner Plastics Fabricators, Inc. entry; pp. 1-247 and 248.

World Catalog of Oil Spill Response Products; Robert Schulze (Editor); 5th Edition (1995); Oil Stop Inc. entry; pp. 1-252 and 253.

World Catalog of Oil Spill Response Products; Robert Schulze (Editor); 5th Edition (1995); RO-Clean International entry; p. 1-257.

World Catalog of Oil Spill Response Products; Robert Schulze (Editor); 5th Edition (1995); Vikoma entry; pp. 1-264 through 267.

World Catalog of Oil Spill Response Products; Robert Schulze (Editor); 5th Edition (1995); Engineered Fabrics Corporation entry; pp. 1-235 and 236.

Oil Stop Inc. boon information form http://www.oilstop.com, http://www.oilstop.com/inflatablebooms.htm and http://www.oilstop.com/autoboom.htm, undated.

RO-Clean International boom information from http://www.ro-cleandesmi.com/contary-boom3500.html, undated.

Vikoma boom information from http://www.vikoma.com, undated.

* cited by examiner

*Primary Examiner*—Frederick L. Lagman
(74) *Attorney, Agent, or Firm*—Renner, Kenner, Greive, Bobak, Taylor & Weber

(57) ABSTRACT

A multi-chamber oil boom includes a first bladder and a second bladder, each having an inflatable interior. A valve includes an air passage that communicates between the interior of the first bladder and the interior of the second bladder. The valve further includes a clamping spring assembly that provides compressive force on the air passage and closes the air passage until partial inflation of the first bladder causes the air passage to open against the compressive force of the clamping spring assembly to open the air passage and allow air to travel from the inflatable interior of the first bladder to the inflatable interior of the second bladder.

8 Claims, 9 Drawing Sheets

FIG—1

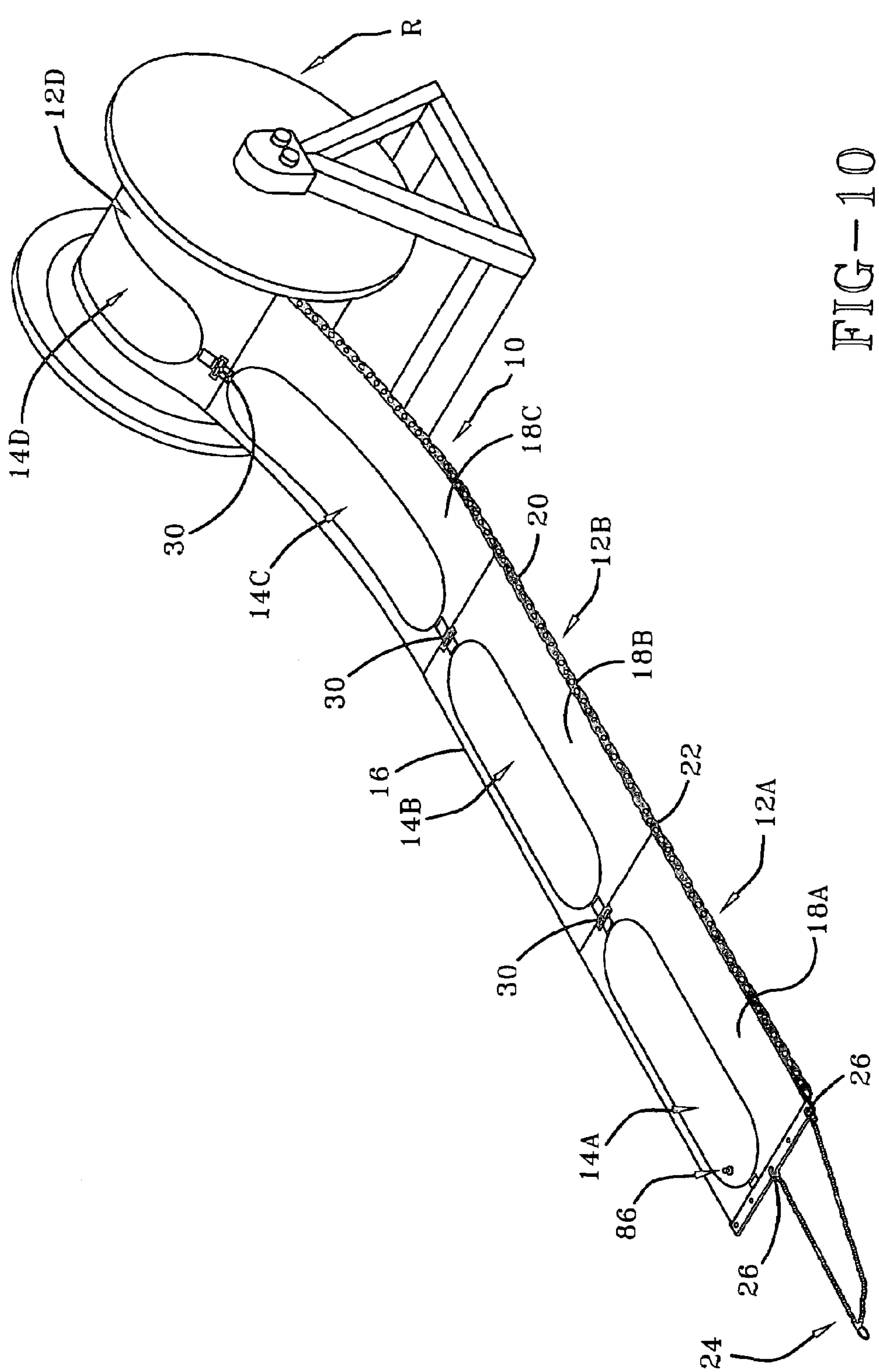
FIG—10

MULTI-CHAMBER OIL BOOM VALVE

TECHNICAL FIELD

The present invention resides in the art of oil booms. More particularly, this invention relates to a valve assembly for a multi-chamber oil boom. The valve assembly communicates between neighboring bladders of a multi-chamber oil boom, and allows for single point inflation of each bladder of the boom. Additionally, the valve ensures that non-punctured bladders of the boom will maintain the boom on the surface of the water, even if other bladders are punctured or otherwise compromised.

BACKGROUND OF THE INVENTION

There are multiple methods currently employed to limit the damage caused by an oil spill and return damaged areas to a more natural condition. These include dispersal, bio-remediation, burning, and containment and recovery of the oil. Dispersal and burning methods tend to spread out the effects of the oil spill rather than removing the oil, and bio-remediation has been found to be of limited utility in deep water. Containment and recovery is the most prevalently used method, and is often the first measure enacted when attempting to clean a spill.

To contain and recover the oil, floating barriers, called "oil booms" or simply "booms," are positioned around the oil slick. Because the oil floats on the water, the boom contains the oil within its boundary. Thus, they serve to prevent the oil from spreading, whether to simply prevent the slick from covering a larger surface area or to protect a shoreline or nearby landmass or ecological system. Once contained, various apparatus, such as vacuum skimmers, floating disk skimmers, and rope skimmers, or oil-absorbent materials, such as talc, straw and saw dust, can be employed to physically remove the oil from the water.

Generally, oil booms consist of one or more inflatable bladders that, when inflated, are towed to surround the oil slick. A weighted barrier hangs down into the water from the inflated bladder(s), and prevents the oil from spreading. Single chamber booms consist of one bladder, and inflate quickly, although they are not very readily shaped to surround the entire slick. Additionally, steps must be taken to prevent against damage to the single bladder, because loss of pressure will cause the boom to deflate, and the oil will be more likely to spread. Multi-chamber booms, consisting of multiple, interconnected bladder sections, are much easier to shape around a spill, because some flexibility exists in the area of interconnection. But, as with the single chamber boom, steps must be taken to prevent deflation, and, as a result, current designs are arduous to inflate.

To prevent complete deflation of a multi-chamber boom, each bladder of the boom is isolated from every other bladder, and a hole in one bladder will cause only that particular bladder to deflate. This design ensures that the remainder of the boom will function efficiently, but, by sealing each bladder off from the others, it also mandates that each bladder be separately inflated when deploying the boom. Because time is a key factor in containing an oil spill and minimizing environmental impact, the multi-point inflation design for multi-chamber oil booms needs to be replaced with a single-point inflation design.

SUMMARY OF THE INVENTION

This invention provides a multi-chamber oil boom that includes a first bladder and a second bladder, each having an inflatable interior. A valve includes an air passage that communicates between the interior of the first bladder and the interior of the second bladder. The valve further includes a clamping spring assembly that provides compressive force on the air passage and closes the air passage until partial inflation of the first bladder causes the air passage to open against the compressive force of the clamping spring assembly to open the air passage and allow air to travel from the inflatable interior of the first bladder to the inflatable interior of the second bladder.

A method is also provided for making a multi-chamber oil boom having a valve positioned between a first and second bladder thereof. This method includes the steps of providing first and second chamber sections, and forming a first bladder in the first chamber section and a second bladder in the second chamber section, wherein the first and second bladders each have an inflatable interior. A valve is formed including an air passage having an inlet and an outlet. The air passage is biased to remain closed by a clamping spring assembly. The inlet of the air passage is fixed to the first bladder to communicate with its inflatable interior, and the outlet of the air passage is fixed to the second bladder to communicate with its inflatable interior.

BRIEF DESCRIPTION OF THE DRAWINGS

FIG. 10 is a perspective view of a multi-chamber oil boom according to this invention, shown stored on a reel, wherein it is appreciated that the substantially flat profile of the valve of this invention does not compromise such storage.

DETAILED DESCRIPTION OF THE PREFERRED EMBODIMENT

Figure 1:
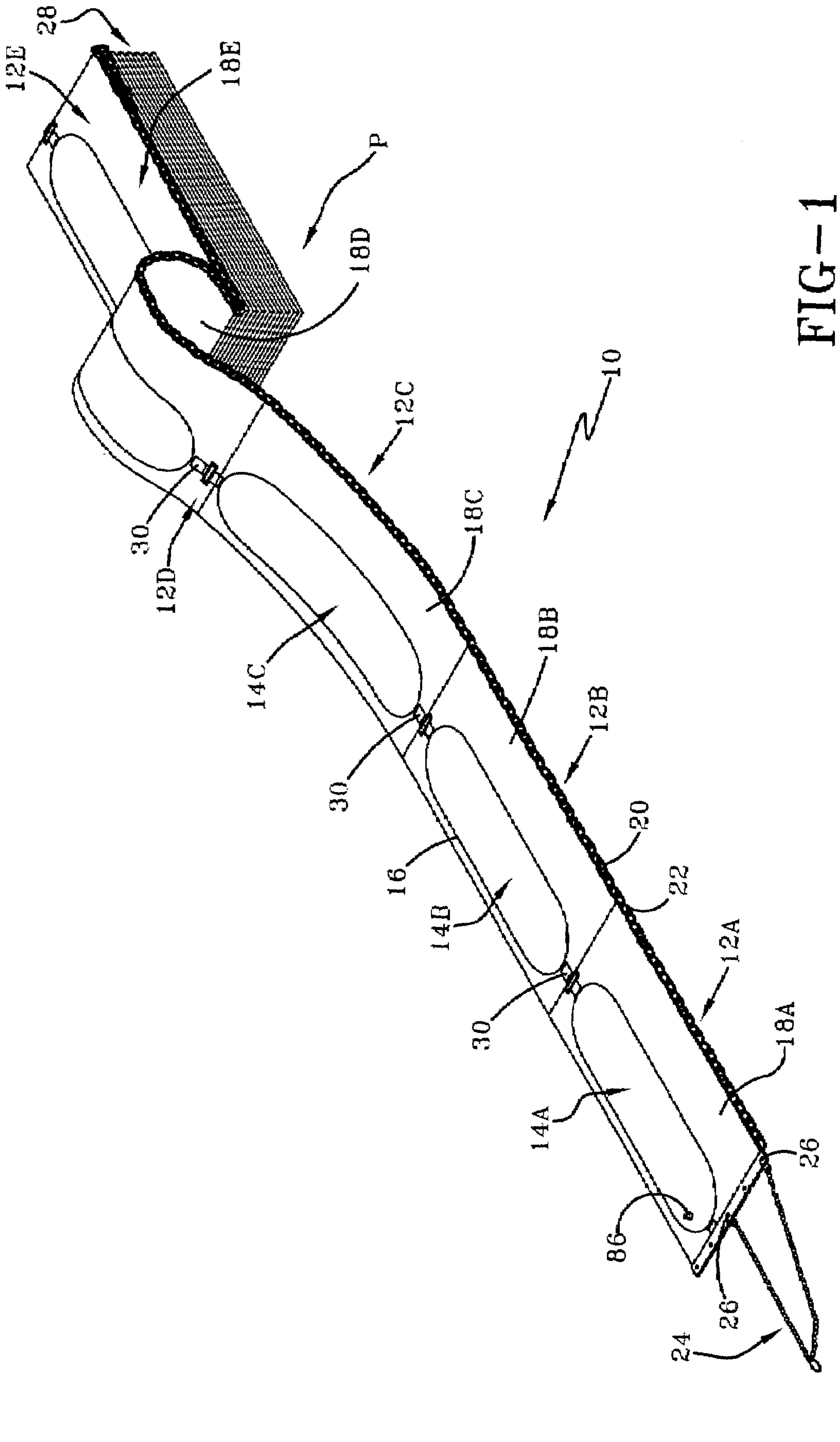
FIG. 1 is a perspective view of a multi-chamber oil boom according to this invention, shown in a stacked configuration on a pallet and bridled for deployment.

Referring to FIG. 1, a preferred embodiment of a multi-chamber oil boom in accordance with this invention is shown and designated generally by the numeral 10. Oil boom 10 includes multiple interconnected chamber sections that will generally be referred to by the numeral 12, and, when necessary, will be individually referred to by their associated letters (12A, 12B, etc.). This holds true for other elements identified both by a numeral and a letter. The chambers 12A, 12B, etc are substantially similar, especially in those features relevant to practice of this invention, such that identical numerals are employed for like elements, with the added letter designation serving to identify the particular section (first section A, second section B, etc) with which that element is particularly associated. That is, although the numbers 12, 14, 18 do not appear in the Figs. without an associated letter designation, it should be appreciated that these numerals (without specific letter designations) are used to refer generically to the elements that, in the Figs., include like numerals but with associated letters.

Thus, each chamber section 12 includes an inflatable bladder 14 proximate top border 16, so named because, when oil boom 10 is used, inflatable bladders 14 are inflated to float on top of the water in which oil boom 10 is deployed, and top border 16 is thus oriented at the "top" of oil boom 10. In contrast, skirt 18 extends from inflatable bladders 14 to bottom border 20. A weight or other ballast means 22 is attached along at least a portion of bottom border 20 to hold skirt 18 under the surface of the water and create a barrier for containing oil within the confines of an area defined by the deployment of oil boom 10. Preferably, ballast means 22 is a chain that runs along the entire length of boom 10 at bottom border 20. Tow bridle 24 is attached to first chamber section 12A at grommets 26 or any other suitable connection means. Tow bridle 24 is ultimately secured to a boat that will tow oil boom 10 around the area of an oil spill, with each successive chamber section 12A, 12B, 12C, etc., being successively towed out of its stacked configuration in stack 28.

In a common prior art method for deploying a multi-chamber oil boom, the oil boom is in a stacked configuration on a pallet P, such as that shown in FIG. 1, or is retained on a reel R, such as that shown in FIG. 10 (although it will be appreciated that in both FIGS. 1 and 10 the oil boom according to this invention is shown, and these Figs. are relied upon here simply to show common storage and transport methods), and the pallet P or reel R is typically carried on a barge that provides adequate deck space for individual inflation of each bladder of each chamber section. A boat tows each successive chamber section out of the pallet P or reel R and on to the deck space of the barge, where workers must individually fill each inflatable bladder from an inflation source also located on the barge. Each bladder is inflated individually because, in the prior art, each bladder is fully sealed off from all other bladders, and are provided with their own fill valve for accepting the fill hose from the inflation source. The process is slow because effort must be made to make sure the boat does not tow a given chamber out of the reach of the workers on the barge, unless the bladder of that chamber has been filled and the inflation hose removed. The process is also labor intensive and generally requires at least two workers on the barge.

In this invention, each bladder 14 communicates with a neighboring bladder 14 through a boom valve 30. Various views of a boom valve 30 are shown in FIGS. 2–5, depicting the boom valve 30 both as an isolated element and as incorporated in a boom 10.

Figure 2:
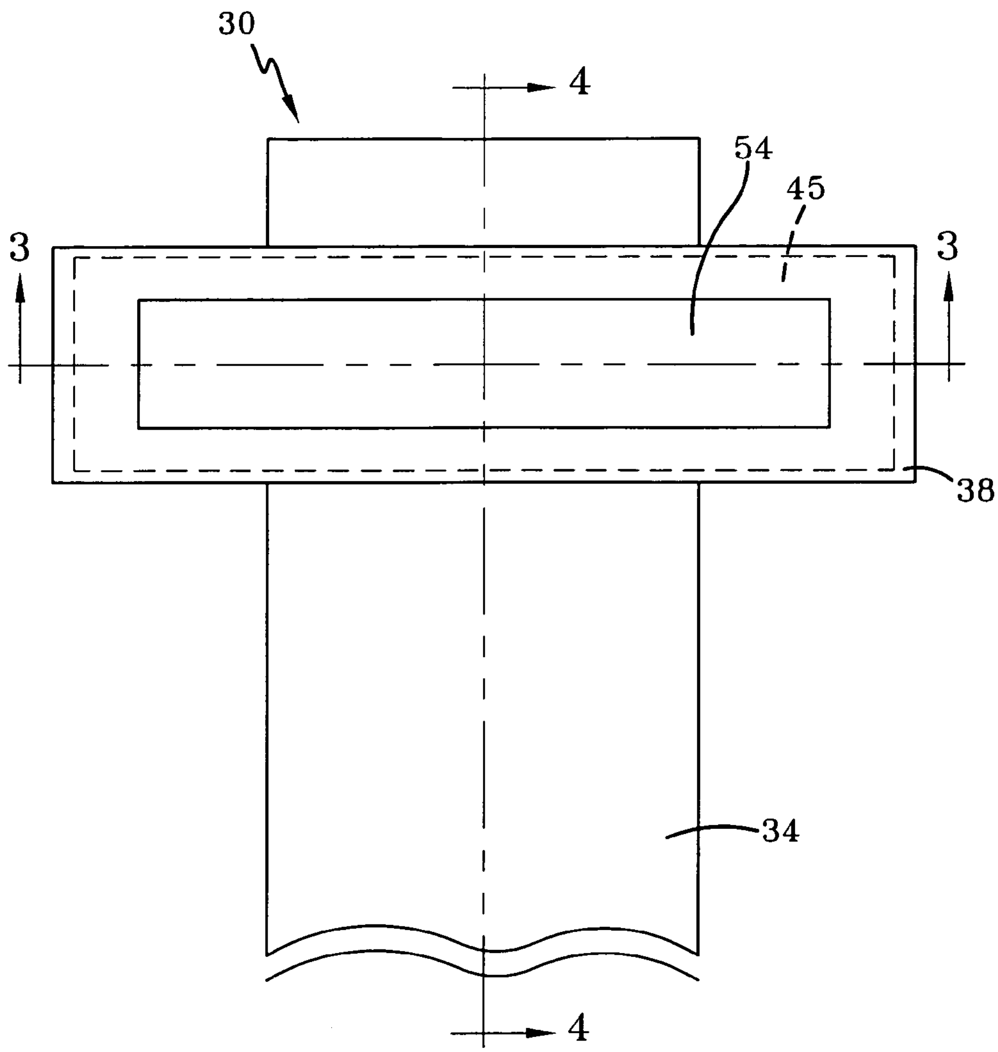
FIG. 2 is a top plan view of a boom valve according to this invention.
Figure 3:
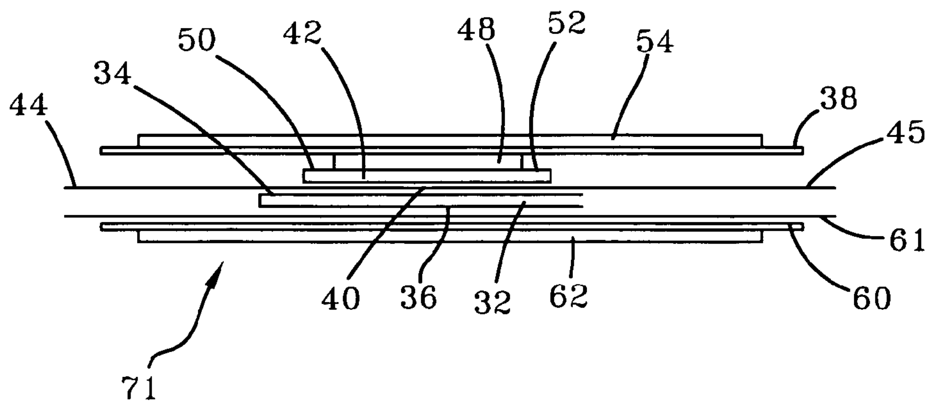
FIG. 3 is a cross-sectional view of the boom valve of FIG. 2, taken along the line 3—3.
Figure 4:
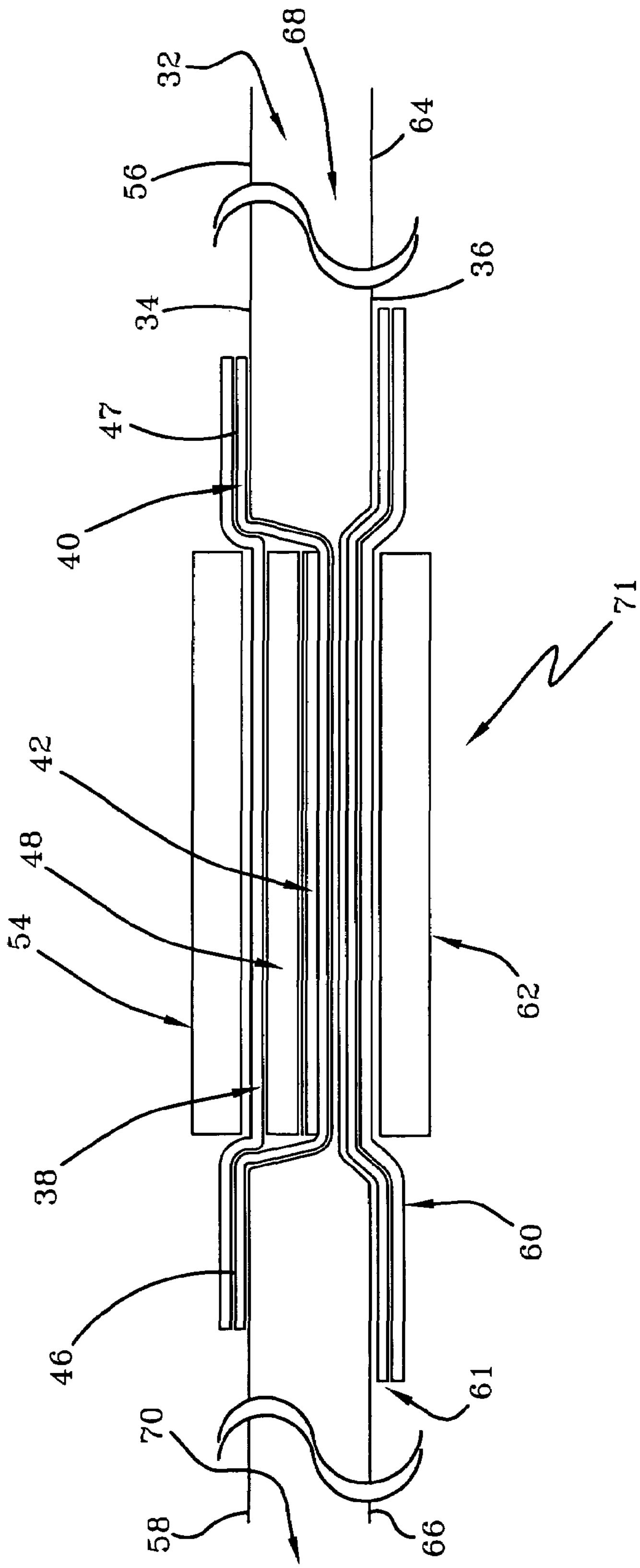
FIG. 4 is a cross-sectional view of the boom valve of FIG. 2, taken along the line 4—4.

The boom valve 30 will first be disclosed with reference to FIGS. 2–4, wherein only the valve 30 is considered. Boom valve 30 includes an air passage 32 that is formed by opposed non-adhering separators 34, 36. Opposed separators 34, 36 need not be interconnected, although in this preferred embodiment, they are provided by a folded film, as seen in the cross-section of FIG. 3. Although the orientation of the elements of boom valve 30 may be altered, elements of boom valve 30 will be referred to with "top" and "bottom" designations to aid in referring to the drawings.

Top fabric layer 38 is adhered to top separator 34 through layers of compressive padding and adhesive. Top adhesive layer 40 covers a portion of top separator 34, and first compressive padding 42 covers a portion of top adhesive layer 40, leaving exposed adhesive areas 44, 45 (FIG. 3) and 46, 47 (FIG. 4). Top compressive padding 48 covers a portion of first compressive padding 42, leaving exposed adhesive areas 50, 52 (FIG. 3), and also leaves top adhesive layer 40 with exposed adhesive areas 46, 47. Top fabric layer 38 is fixed to top adhesive layer 40 at areas 44, 45, 46 and 47, and is fixed to first compressive padding 42 at areas 50, 52. Top clamping spring 54 is adhered to the top surface of top fabric layer 38 during the construction of boom 10, as will be explained more fully below.

With reference to FIGS. 2 and 4, top separator 34 extends transverse to top fabric layer 38 from an inlet end 58 to an outlet end 56. Bottom fabric layer 60 is adhered to bottom separator 36 through a bottom adhesive layer 61. Bottom clamping spring 62 is fixed to the bottom of bottom fabric layer 60 during the building of boom 10, as will be explained more fully below. Bottom separator 36 extends transverse to bottom fabric layer 60 from an inlet end 66 to an outlet end 64, and separators 34, 36 and fabric layers 38, 60 are aligned such that top separator 34 and bottom separator 36 define air passage 32, having an inlet 70 and outlet 68.

Above, the assembly of valve 30 is generally disclosed with reference to adhesive layers and compressive padding. In the preferred embodiment, adhesive layers 40 and 61 are adhesive gums, namely nitrile-base adhesives, although this invention is not limited thereto. The adhesive gums preferably employed for adhesive layers 40, 61 will directly adhere mating surfaces to one another, and, in this particular embodiment, directly adhere top fabric layer 38 to bottom fabric layer 60, transverse to and around separators 34, 36 and compressive padding 42, 48 (FIG. 3). Top clamping spring 54 and bottom clamping spring 62 are respectively fixed to top fabric layer 38 and bottom fabric layer 60, which layers 38, 60 are adhered to one another through adhesive layers 40, 61, such that clamping springs 54 and 62 are operatively connected and form a clamping spring assembly 71. This clamping spring assembly 71 is biased to maintain a substantially flat profile, and, as a result, the compressive padding 42, 48, as the name implies, provides positive pressure against air passage 32, "compressing" the air passage 32 closed. Without limiting this invention, compressive padding 42 and 48 are preferably of soft sheet rubber, generally of a low durometer of less than about 60 Shore A. To fix springs 54, 62 to their respective fabric layers 38, 60, fabric layers 38, 60, in the preferred embodiment, are rubber coated, and springs 54, 62 adhere to fabric layers 38, 60 during a press or vacuum cure, wherein the rubber coating of the layers 38, 60 sets up and binds springs 54, 62, thereto. This is a preferred means for securing springs 54, 62, as it takes advantage of the curing process and the material make-up of the layers 38, 60; however, adhering elements together may be accomplished in any suitable manner known in the art. For instance, separate adhesive layers may be employed.

Clamping springs 54, 62 are preferably made from a composite material, such as a fiberglass and epoxy composite or a carbon fiber and epoxy composite. However, any material that is structurally sound and able to provide the necessary clamping force to maintain air passage 32 closed may be employed. As another non limiting example, clamping springs 54, 62 may be formed from stainless steel. In the preferred embodiment, clamping springs 54, 62 are plate springs, which are flat and tend to retain that flat profile in the completed structure of boom 10. This flat profile provides a biasing force against air passage 32 to seal (or close) air passage 32.

Figure 5:
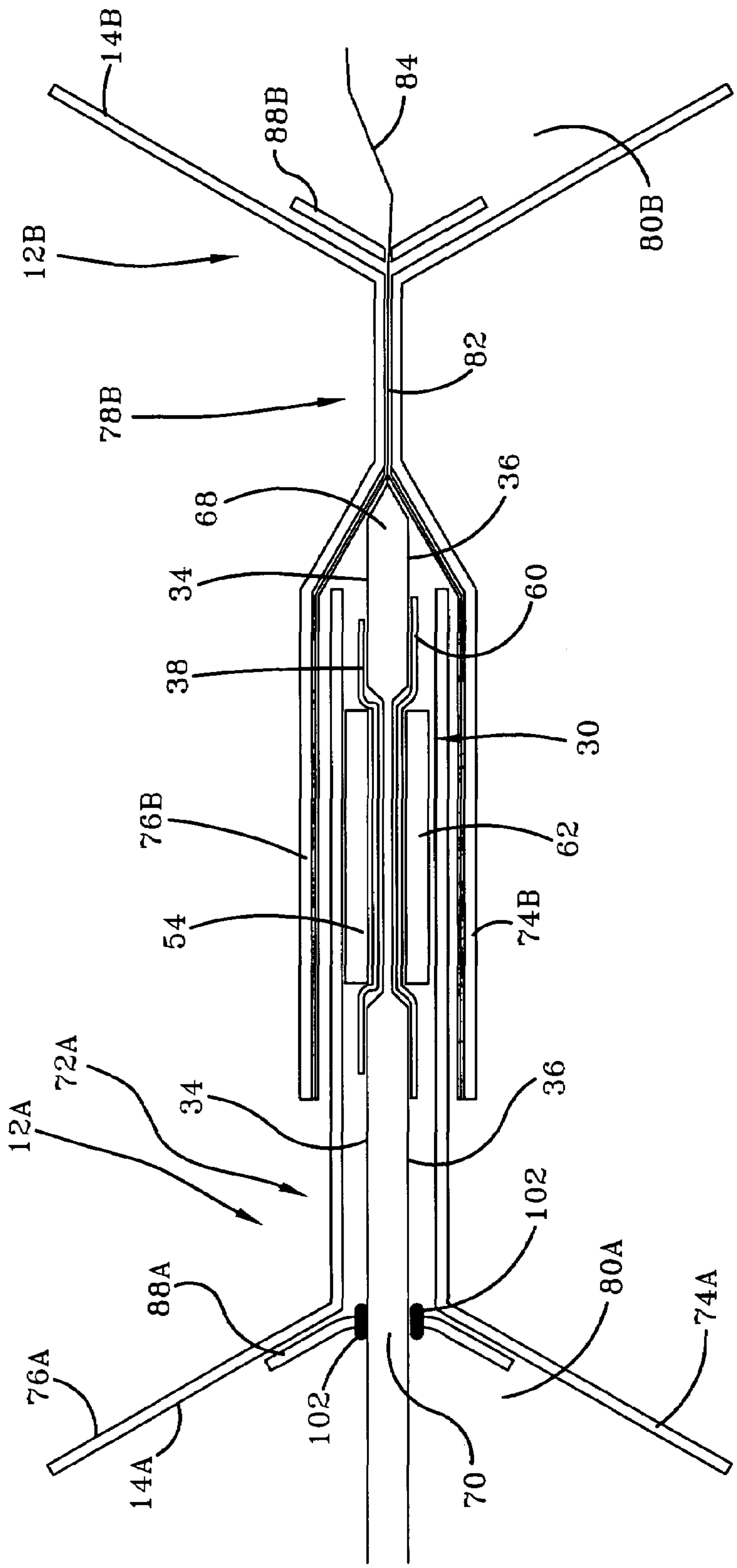
FIG. 5 is a cross-sectional view depicting how neighboring chamber sections of the boom communicate through the boom valve.

Referring now to FIG. 5, valve 30 is depicted in cross section as it extends between bladder 14A of chamber section 12A and bladder 14B of chamber section 12B. Each of the valves 30 within the entire boom 10 are preferably substantially identical, and the valve 30 communicating between bladder 14A and bladder 14B is chosen for exemplary purposes only (i.e., the communication of a valve 30 between other adjacent bladders (e.g. 14B/14C or 14C/14D) is substantially identical). Valve 30 is sealed between the material layers forming chamber sections 12A and 12B. More particularly, at outlet end 72A of chamber section 12A, a bottom chamber layer 74A is adhered over bottom clamping spring 62 and bottom fabric layer 60 of valve 30, and top chamber layer 76A is adhered over top clamping spring 54 and top fabric layer 38 of valve 30. At inlet end 78B of chamber section 12B, a bottom chamber layer 74B is adhered over bottom chamber layer 74A, at valve 30, and a top chamber layer 76B is adhered over top chamber layer 76A of bladder 14A, at valve 30. Air passage 32, through opposed separators 34, 36, communicates with the inflatable interior 80A of bladder 14A, at air passage inlet 70. Air passage outlet 68, in conjunction with outlet separator 82 and crotch tape separator 84, communicates with the inflatable interior 80B of bladder 14B.

As shown in FIG. 1, fill port 86 is provided in bladder 14A, such that bladder 14A is the first bladder to be inflated when an inflation source (not shown) is connected to fill port 86 and activated. Clamping springs 54, 62 interact to provide compressive force on air passage 32, and close air passage 32 until partial inflation of interior 80A of bladder 14A causes air to flow through air passage inlet 70 to open passage 32 against the compressive force of clamping springs 54, 62. Thus, at a sufficient pressure that is dependent upon the degree of compressive force exerted by springs 54, 62, air passage 32 will open and allow air to travel from bladder 14A, through outlet end 72A and air passage inlet 70, to inlet end 78B and air passage outlet 68, to inflate interior 80B of bladder 14B.

Bottom and top chamber layers 74B, 76B of chamber section 12B and bottom and top chamber layers 74A, 76A of chamber section 12A are preferably vacuum cured in an autoclave around valve 30, as shown, such that clamping springs 54, 62 are sealed substantially flat and, in conjunction with compressive padding 42, 48, provide compressive force to bias air passage 32 to seal or close. Compressive padding 42, 48 is preferred because it provides further positive pressure against air passage 32.

As mentioned, bladder 14A is the first bladder to be inflated, and, when bladder 14A is filled to a sufficient internal pressure, air flowing through air passage 32 at air passage inlet 70 and through outlet end 72A of chamber section 12A forces valve 30 to open air passage 32 to allow air to travel to air passage outlet 68 and fill bladder 14B. Likewise, when bladder 14B is filled to a sufficient internal pressure, the valve 30 extending between bladder 14B and bladder 14C (FIG. 1), is forced open to allow air to travel to bladder 14C. Thus, each successive bladder 14 is filled to a pressure sufficient to cause each successive valve 30 to open its air passage 32 to allow for inflation of the next bladder 14. Notably, a loss of pressure in one particular bladder will cause its associated valves 30 to close, as the pressure within the bladder will not remain sufficient for maintaining the valves in an open state. For example, if boom 10 was fully inflated, and bladder 14B was punctured, bladder 14B would quickly lose pressure, and the valves 30 between bladders 14B and 14A and between bladders 14B and 14C would close against their respective air passages 32. Thus, the boom 10 of this invention, through the valves 30, automatically and reliably closes off damaged chamber sections 12, allowing the remainder of boom 10 to remain afloat and useful.

In a method for making a multi-chamber oil boom 10, each chamber section 12 is separately formed, and then individual sections 12 are joined with valves 30 communicating between neighboring bladders 14. With reference to FIGS. 6–9, a method for making boom 10 is disclosed, and further details of the preferred embodiment of first fill chamber section 12A (with fill port 86), its neighboring chamber section 12B, and their communication with valve 30 will be appreciated. By understanding the interaction of these elements, an entire boom, such as boom 10, can be manufactured.

Figure 6:
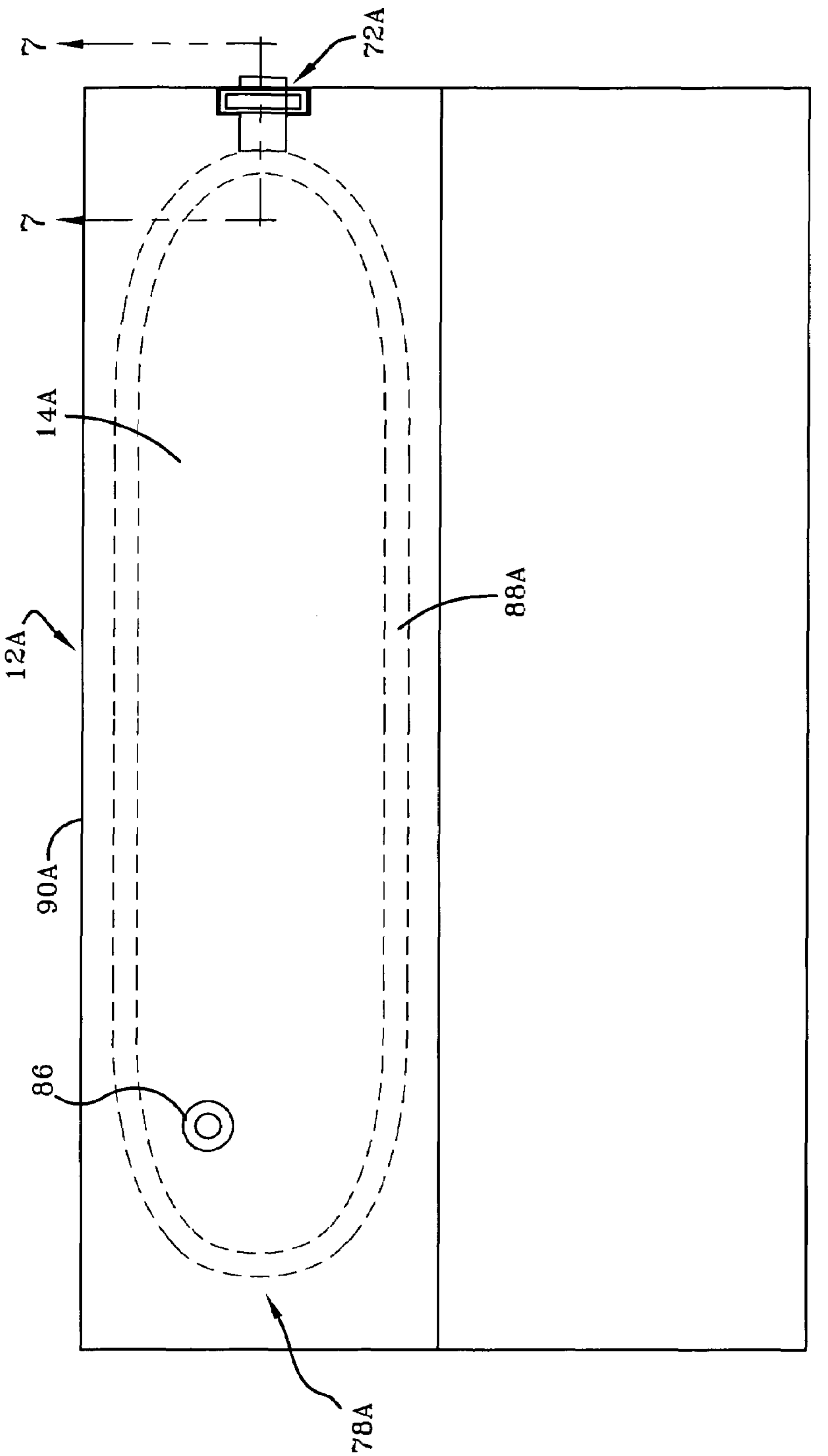
FIG. 6 is a top plan view of a first chamber section.
Figure 7:
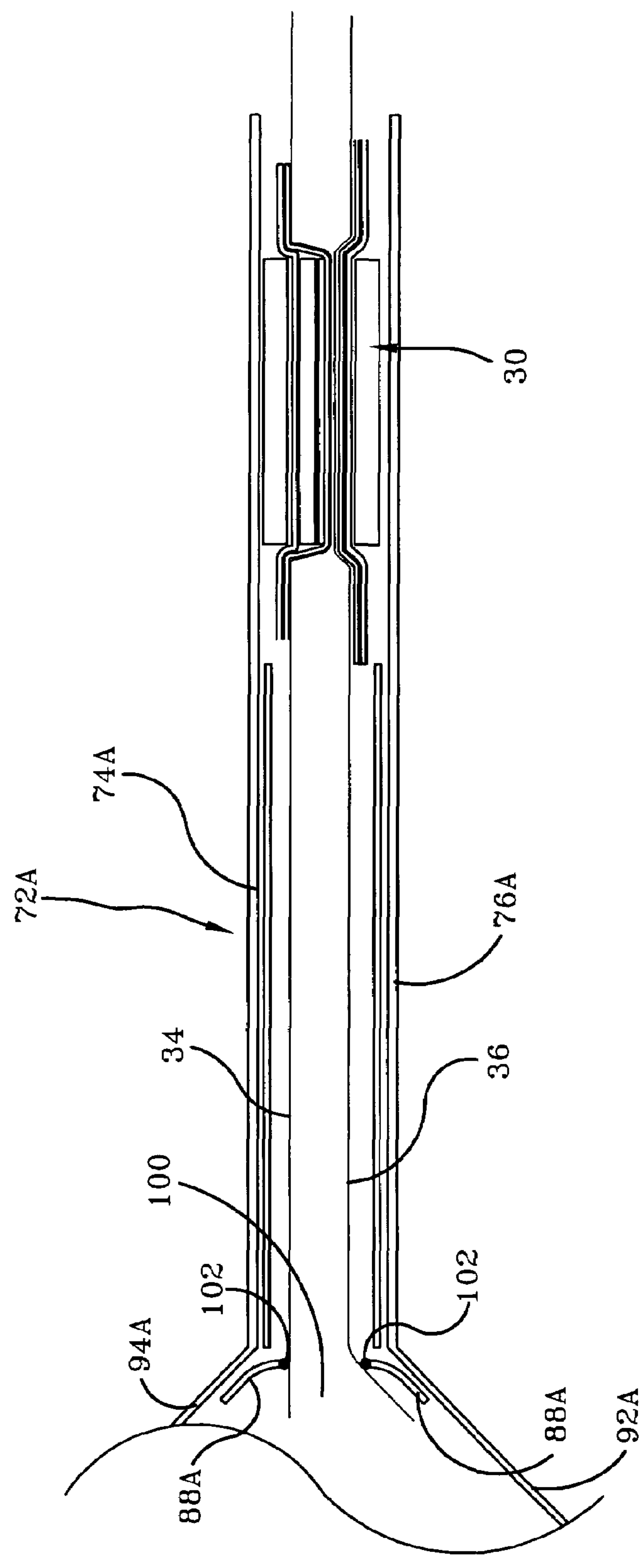
FIG. 7 is a cross-sectional view of an outlet end of the first chamber section of FIG. 6, taken along the line 7—7.

With reference to FIGS. 6 and 7 the fabrication of first chamber section 12A begins with the adherence of crotch tape 88A proximate to top border 90A of bottom chamber layer 76A. Crotch tape 88A encloses an area that defines a first bladder wall 92A in bottom chamber layer 76A. Top chamber layer 74A is adhered, preferably through vacuum curing, to crotch tape 88A and bottom chamber layer 76A, but is not adhered thereto in the area of first bladder wall 92A. Thus, top chamber layer 74A provides a second bladder wall 94A and, together with first bladder wall 92A, defines inflatable interior 80A. With particular reference to FIG. 7, it will be seen that, prior to curing together the top and bottom chamber layers 74A, 76A, valve 30 is positioned such that separators 34, 36 extend into a slot 100 in crotch tape 88A. To seal separators 34, 36 to crotch tape 88A, an appropriate sealant 102 is employed. This sealant might directly seal separators 34, 36 to crotch tape 88A or might seal them upon curing. Separators 34, 36 prevent top and bottom chamber layers 74A, 76A from bonding together (at the overlap with separators 34, 36) during curing such that, air passage 32 is provided between top and bottom chamber layers 74A, 76A, when first chamber section 12A is fabricated. After fabrication, first chamber section 12A may be joined to second chamber section 12B, with valve 30 communicating between bladder 14A and bladder 14B. This joinder has been discussed at FIG. 5.

Figure 8:
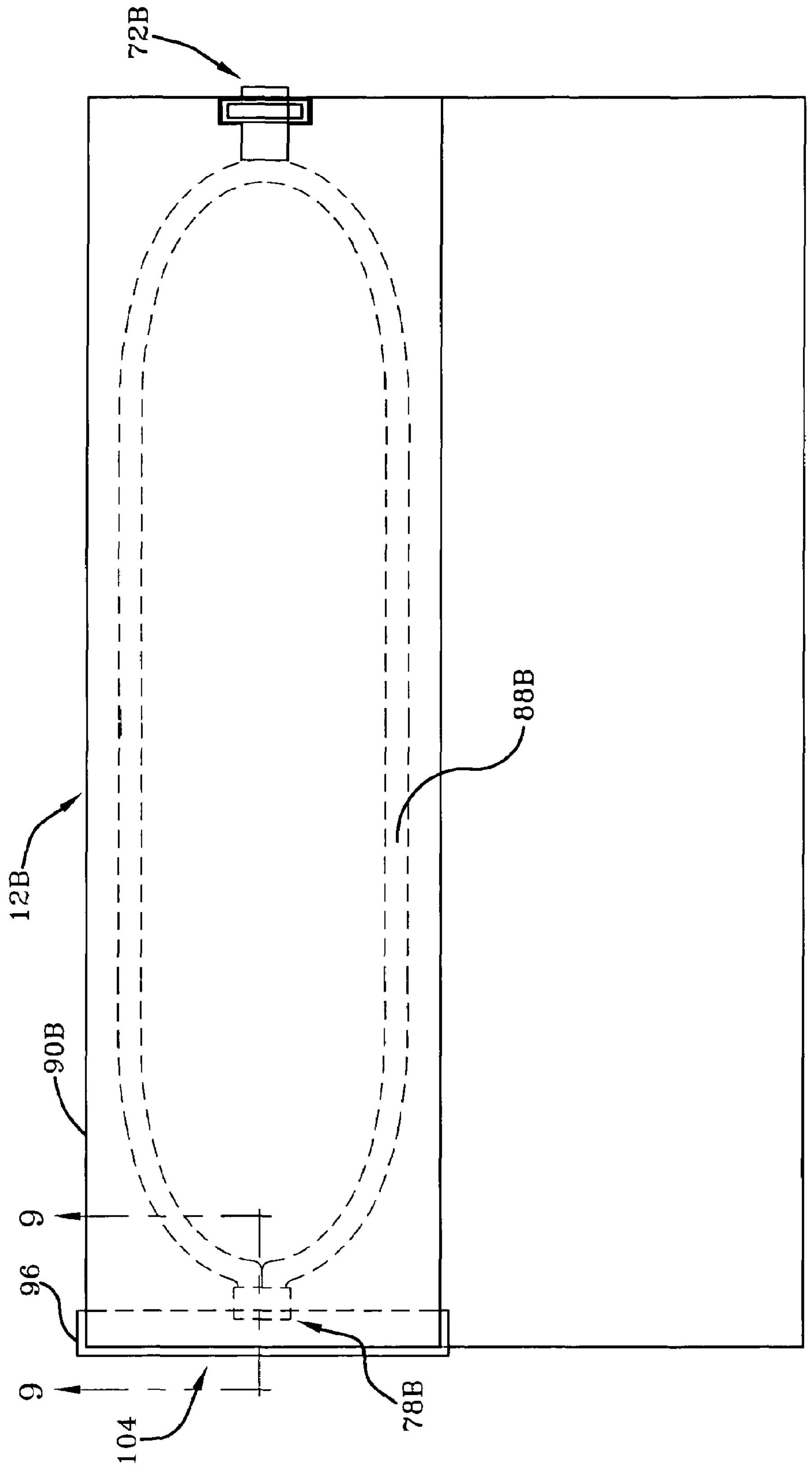
FIG. 8 is a top plan view of a second chamber section.
Figure 9:
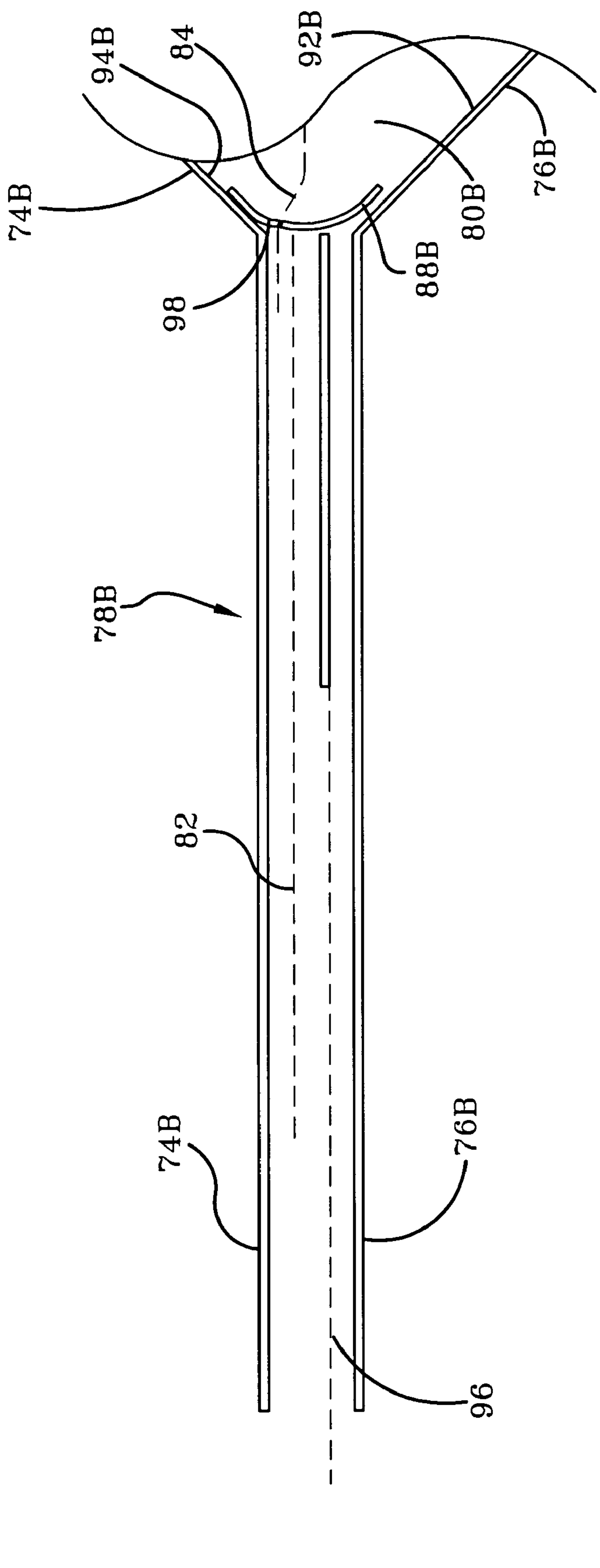
FIG. 9 is a cross-sectional view of an inlet end of the second chamber section of FIG. 8, taken along the line 9—9.

The fabrication of second chamber 12B is similar to that of first chamber 12A. With reference to FIGS. 8 and 9, the fabrication of second chamber section 12B begins with the adherence of crotch tape 88B proximate to top border 90B of bottom chamber layer 76B. Crotch tape 88B encloses an area that defines a first bladder wall 92B on bottom chamber layer 76B. Top chamber layer 74B is adhered, preferably through vacuum curing, to crotch tape 88B and bottom chamber layer 76B, but is not adhered thereto in the area of first bladder wall 92B. Thus, top chamber layer 76B provides a second bladder wall 94B and, together with first bladder wall 92B, defines inflatable interior 80B. With particular reference to FIG. 9, it will be seen that, prior to curing together the top and bottom chamber layers 74B, 76B, outlet separator 82, crotch tape separator 84, and joinder area separator 96 (see also FIG. 8) are positioned in outlet end 78B, with crotch tape separator 84 extending between a slot 98 in crotch tape 88B. Crotch tape separator 84 ensures that slot 98 is not compromised during curing, and can be removed after the fabrication of chamber 12B is completed, here, through curing. Separators 82, 96 prevent top and bottom chamber layers 74A, 76A from bonding together during curing such that, when completed, first chamber section 12A maybe joined to second chamber section 12B. Separator 82 is sized and positioned to substantially align with air passage 32 of valve 30 (fixed, as above, between top and bottom chamber layers 74A, 76A of chamber section 12A), while separator 96, as seen in FIG. 8, extends to allow end 104 of section 12B to overlap valve 30.

Outlet end 72B of second chamber 12B is substantially identical to outlet end 72A of chamber 12A. Thus, an additional section 12C, having an inlet end substantially similar to inlet end 78B of chamber 12B can be fixed to chamber 12B, and this process can be repeated for a multitude of chamber sections, to create a boom of desired length.

From the disclosure herein, it should be apparent that the valves 30 do not significantly compromise the ability of the multi-chamber oil boom 10 to lay flat, in either a stacked configuration on a pallet P (FIG. 1) or a rolled configuration on a reel R (FIG. 10). This is yet another benefit of this invention. That is, because the preferred embodiment employs flat clamping springs 54, 62, and maintains the flat profile of these springs 54, 62, during manufacture of the boom 10, the boom 10 may be rolled and stored and transported on a reel R, without compromising the rolled configuration with bulging valve portions.

In light of the foregoing, it should be evident that the multi-chamber oil boom and method of this invention substantially improves the art. While, in accordance with the patent statutes, only the preferred embodiments of the present invention have been described in detail hereinabove, the present invention is not limited thereto or thereby. Adaptations of the preferred embodiment disclosed herein will be readily apparent to those of ordinary skill in the art, and, thus, the scope of the invention shall include all modifications and variations that may fall within the scope of the attached claims.

What is claimed is:

1. A multi-chamber oil boom comprising:

a first bladder having an inflatable interior;

a second bladder having an inflatable interior; and a valve including:

an air passage that communicates between said inflatable interior of said first bladder and said inflatable interior of said second bladder; and a clamping spring assembly that provides compressive force to flatten said air passage and thereby prevent air travel from said first bladder to said second bladder until partial inflation of said inflatable interior of said first bladder causes said air passage to open against the compressive force of said clamping spring assembly to open said air passage from its flattened state and allow air to travel from said inflatable interior of said first bladder to said inflatable interior of said second bladder.

2. The multi-chamber oil boom of claim 1, wherein said clamping spring assembly includes opposed springs of flat profile that are urged to press against one another to hold the air passage in the flattened state.

3. The multi-chamber oil boom of claim 2, wherein said clamping spring assembly further includes compressive padding that acts on said opposed springs of flat profile to urge them to hold the air passage in the flattened state.

4. The multi-chamber oil boom of claim 2, wherein said air passage is formed by two opposed separators that do not adhere to one another, and said opposed springs of flat profile press on said opposed separators to hold the air passage in the flattened state.

5. A method for making a multi-chamber oil boom having a valve positioned between a first and second bladder thereof, the method comprising the steps of:

providing a first chamber section;

providing a second chamber section;

forming a first bladder in the first chamber section and a second bladder in the second chamber section, wherein the first and second bladders each have an inflatable interior;

forming a valve including an air passage and a clamping spring assembly, said air passage having an inlet and an outlet, wherein the air passage is biased by said clamping spring assembly to a flattened state that does not permit the flow of air through said air passage;

fixing the valve between the first and second bladders such that the inlet of the air passage of the valve communicates with the inflatable interior of the first bladder and the outlet of the air passage of the valve communicates with the inflatable interior of the second bladder.

6. The method of claim 5, wherein said step of forming a valve includes positioning springs of flat profile on opposed sides of the air passage, and biasing the springs to press against one another to hold the air passage in the flattened state.

7. The method of claim 6, wherein said step of forming a valve includes positioning compressive padding over each of said springs of flat profile to urge said springs to press against one another.

8. The method of claim 7, wherein said step of forming a valve includes forming the air passage from opposed separators that do not adhere to one another, the springs of flat profile and the compressive padding acting on said opposed separators to hold the air passage in the flattened state.

* * * * *